United States Patent
Amon et al.

(10) Patent No.: US 6,303,233 B1
(45) Date of Patent: Oct. 16, 2001

(54) UNIAXIALLY SHRINKABLE BIAXIALLY ORIENTED POLYPROPYLENE FILM

(75) Inventors: Moris Amon, Pittsford; Salvatore J. Pellingra, Jr., Wolcott; Tien-Kuei Su, Fairport, all of NY (US)

(73) Assignee: Mobil Oil Corporation, Fairfax, VA (US)

(*) Notice: Subject to any disclaimer, the term of this patent is extended or adjusted under 35 U.S.C. 154(b) by 0 days.

(21) Appl. No.: 09/055,479

(22) Filed: Apr. 6, 1998

(51) Int. Cl.$^7$ .............................. B32B 27/32; B65B 53/02
(52) U.S. Cl. ....................... 428/516; 428/34.9; 428/910
(58) Field of Search ...................... 428/516, 910, 428/515, 34.9

(56) References Cited

U.S. PATENT DOCUMENTS

| | | | |
|---|---|---|---|
| 3,808,304 | 4/1974 | Schirmer | 264/289 |
| 4,188,350 | 2/1980 | Vicik et al. | 525/232 |
| 4,194,039 | 3/1980 | Mueller | 428/213 |
| 4,377,616 | 3/1983 | Ashcraft et al. | 428/213 |
| 4,390,385 | 6/1983 | Ferguson et al. | 156/229 |
| 4,393,115 | 7/1983 | Yoshii et al. | 428/323 |
| 4,448,792 | 5/1984 | Schirmer | 426/113 |
| 4,582,752 | 4/1986 | Duncan | 428/317 |
| 4,585,817 * | 4/1986 | Su et al. | 524/108 |
| 4,603,174 | 7/1986 | Okada et al. | 525/240 |
| 4,632,869 | 12/1986 | Park et al. | 428/315 |
| 4,704,421 | 11/1987 | Teskin | 524/287 |
| 4,769,418 | 9/1988 | Mizuno et al. | 525/106 |
| 4,801,637 | 1/1989 | McCullough, Jr. | 524/287 |
| 4,826,735 | 5/1989 | Ueki et al. | 428/476.1 |
| 4,853,602 | 8/1989 | Hommes et al. | 318/310 |
| 4,963,418 | 10/1990 | Isaka et al. | 428/156 |
| 4,981,938 | 1/1991 | Hanari et al. | 526/351 |
| 5,091,236 | 2/1992 | Keller et al. | 428/156 |
| 5,091,237 | 2/1992 | Schloegl et al. | 428/215 |
| 5,118,566 | 6/1992 | Wilhelm et al. | 428/339 |
| 5,132,157 | 7/1992 | Asanuma et al. | 428/141 |
| 5,231,126 | 7/1993 | Shi et al. | 524/296 |
| 5,252,384 | 10/1993 | Bothe et al. | 428/212 |
| 5,254,394 | 10/1993 | Bothe et al. | 428/212 |
| 5,264,277 | 11/1993 | Frognet et al. | 428/315.5 |
| 5,288,548 | 2/1994 | Weber | 428/315.9 |
| 5,292,561 | 3/1994 | Peiffer et al. | 428/35.1 |
| 5,441,806 | 8/1995 | Brandt et al. | 428/349 |
| 5,441,807 | 8/1995 | Brandt et al. | 428/349 |
| 5,460,878 | 10/1995 | Hostetter | 428/319.1 |
| 5,556,920 | 9/1996 | Tanaka et al. | 525/216 |
| 5,620,803 | 4/1997 | Oyama et al. | 428/516 |
| 5,691,043 * | 11/1997 | Keller et al. | 428/212 |

FOREIGN PATENT DOCUMENTS

| | | |
|---|---|---|
| 0 204 843 A1 | 12/1984 | (EP) . |
| 0 299 750 A2 | 7/1988 | (EP) . |
| 0 321 964 A2 | 12/1988 | (EP) . |
| 0 477 742 | 9/1991 | (EP) . |
| 0 595 270 | 10/1993 | (EP) . |

* cited by examiner

Primary Examiner—Paul Thibodeau
Assistant Examiner—D. Lawrence Farazano

(57) ABSTRACT

A uniaxially heat-shrinkable, biaxially oriented, multilayer film having a polypropylene-containing core layer containing at least 70 wt. % of the multilayer film and at least one polyolefin-containing skin layer adjacent the core layer is prepared by biaxially orienting a coextrudate and thereafter orienting the coextrudate by stretching 10 to 40% in the machine direction. The core layer contains isotactic polypropylene, a modifier which reduces the crystallinity of the polypropylene-containing core layer and a nucleating agent. Such modifiers include atactic polypropylene, syndiotactic polypropylene, ethylene-propylene copolymer, propylene-butene-1 copolymer, ethylene-propylene-butene-1 terpolymer, and linear low density polyethylene. The nucleating agent improves long term dimensional stability. The skin layer can be high density polyethylene on both sides or high density polyethylene on one side and isotactic polypropylene on the other side.

10 Claims, No Drawings

UNIAXIALLY SHRINKABLE BIAXIALLY ORIENTED POLYPROPYLENE FILM

RELATED APPLICATIONS

This case is related by subject matter to U.S. application Ser. No. 08/890,661, filed Jul. 9, 1997; U.S. application Ser. No. 08/873,133, filed Jun. 10, 1997; U.S. application Ser. No. 08/858,850, filed May 19, 1997; 08/806,428, filed Feb. 26, 1997; and U.S. application Ser. No. 08/427,785, filed Apr. 25, 1995, now U.S. Pat. No. 5,691,043, which is a continuation in part of U.S. application Ser. No. 08/276,124, filed Jul. 15, 1994, the entire contents of which are incorporated herein by reference.

BACKGROUND OF THE INVENTION

The present invention relates to the field of polymer films and, more particularly to a uniaxially heat shrinkable biaxially oriented polypropylene film.

As noted in U.S. Pat. No. 4,194,039, polyolefins can be used to prepare shrink films for wrapping purposes. Other suitable synthetic resins include various ionomers, polyvinyl chlorides, polyesters, polystyrenes and polyvinylidene chlorides.

A shrink film's distinguishing characteristic is its ability upon exposure to some level of heat to shrink or, if restrained, to create shrink tension within the film. This ability is activated by the packager when the wrapped product is passed through a hot air or hot water shrink tunnel. The resulting shrinkage of the film results in an aesthetically pleasing transparent or opaque wrapping which conforms to the contour of the product while providing the usual functions required of packaging materials such as protection of the product from loss of components, pilferage, or damage due to handling and shipment. Typical items wrapped in polyolefin shrink films are toys, games, sporting goods, stationery, greeting cards, hardware and household products, office supplies and forms, foods, phonograph records, and industrial parts.

The manufacture of shrink films requires relatively sophisticated equipment including extrusion lines with "racking" capability, irradiation units when cross-linking is desired, tenter frames, mechanical centerfolders, and slitters. "Racking" or "tenter framing" are conventional orientation processes which cause the film to be stretched in the cross or transverse direction and in the longitudinal or machine direction. The films are usually heated to their orientation temperature range which varies with different polymers but is usually above room temperature and below the polymer's melting temperature. After being stretched, the film is rapidly cooled to quench it thus freezing the molecules of film in their oriented state. Upon heating, the orientation stresses are relaxed and the film will begin to shrink back to its original, unoriented dimension.

Certain applications, e.g., labelling, covering, or packaging of materials such as boxes, plates, vessels, bottles, tubes, cylindrical material, e.g., pipes, and rods, etc. are especially susceptible to covering with heat shrinkable films. However, in certain situations it is desirable to effect shrinkage along a single axis without substantial shrinkage in the cross-direction. For example, in the process of labelling bottles by shrinking a tube of heat shrinkable material, if the film shrinks along its length, the label may not be placed in the right position but rather placed above the desired position upon shrinkage. Moreover, printing and other conversion processes of such label surfaces require heat stability in substantially one direction to meet machinability requirements. Uniaxially shrinkable materials can also be used in preparing tightly wrapped containers by lap heat sealing or lap hot melt adhesive sealing uniaxially shrinkable film resulting in shrink down of the wrapping.

In order to obtain uniaxially shrinkable materials it is possible to employ uniaxially oriented materials, i.e., materials which are oriented in only one direction. However, uniaxially oriented film can lack the requisite strength and toughness necessary for use in such applications. Inasmuch as biaxially oriented films exhibit desirable strength and tear resistance in both directions of orientation, it would be desirable to obtain a uniaxially heat shrinkable film which is biaxially oriented and thus substantially stable in the cross-direction.

For more detailed disclosures of heat shrinkable films, reference may be had to aforesaid U.S. Pat. No. 4,194,039, as well as U.S. Pat. Nos. 3,808,304; 4,188,350; 4,377,616; 4,390,385; 4,448,792; 4,582,752; and 4,963,418, all of which are incorporated herein by reference.

U.S. Pat. No. 5,292,561 (corresponding to EPA 0498249) discloses a process for producing polyolefin shrink films having high unidirectional shrinkage (at least 10% longitudinal shrinkage and less than 2% transverse shrinkage at 100° C.) under conditions comprising an MD reorientation and mechanical MD/TD draw ratio between 1.01 and 7.5. The base layer of the films contain propylene polymer and optionally, hydrogenated hydrocarbon resin.

EPA 0204843 discloses a low temperature shrinkable film comprising linear low-density polyethylene resin having film shrink properties of 30% or more MD and 5% or less TD at 90° C., which is prepared by drawing the film at a high draw ratio (3 to 6) in the machine direction.

EPA 0321964 describes a process for extruding a shrink film from a linear low density copolymer of ethylene and at least one alpha-olefin having 3 to 6 carbon atoms to provide a material which exhibits shrinkage at 135° C. of at least 30% MD and at least 10% TD.

EPA 0477742 discloses a transparent polypropylene shrink film which exhibits shrinkage at 100° C. of at least 10% MD and less than 2% TD. The polypropylene comprises a 15% or less, preferably 2 to 6% n-heptane soluble component.

EPA 0299750 discloses a mono- or biaxially stretched film having a heat shrinkage of 20% or more in one of the longitudinal and transverse directions and 60% or more in the other direction. The film comprises principally a linear polyethylene and optionally, a branched low-density polyethylene.

EPA 0595270 discloses a heat sealable laminate having high unidirectional shrinkage. produced from biaxially oriented polymeric film such as biaxially oriented polypropylene or blends of polypropylene and copolymers of propylene with minor amounts of ethylene or an alpha-olefin. Uniaxial shrinkability is achieved by balancing MD reorientation process variables such as temperature, draw ratio, line speed, and oriented polymer film properties. Heat sealability is imparted by the presence of a heat seal layer.

Generally, the desired high level of MD shrinkage at label application temperatures (above about 130° C.) is accompanied by proportionally high MD shrinkage at storage temperatures. High MD shrinkage at storage temperatures results in roll tightening and ensuing film distortions and blocking. Another consequence of high MD shrinkage at storage temperatures in the case of film stored after printing is loss of accuracy in the MD label repeat distance.

It is the object of the present invention to provide a biaxially oriented multilayer film comprising a polypropylene core which is uniaxially heat shrinkable with long term stability.

SUMMARY OF THE INVENTION

The present invention relates to a uniaxially heat-shrinkable, biaxially oriented, multilayer film having a polypropylene-containing-core layer and at least one polyolefin containing skin layer adjacent said core layer. The core layer contains isotactic polypropylene, a nucleating agent and a modifier which reduces the crystallinity of the polypropylene containing core layer. The addition of a nucleating agent to the core improves long term dimensional stability.

In one embodiment, the core layer contains isotactic polypropylene, a nucleating agent and syndiotactic polypropylene to improve long term dimensional stability.

It has been found that a nucleating agent in combination with syndiotactic polypropylene in the core layer provides good high-temperature immediate shrinkage, for example at label application temperatures above about 130° C., while reducing low-temperature long-term shrinkage, up to about 50° C. in hot climates.

DETAILED DESCRIPTION OF THE INVENTION

Core

The composition of the polypropylene-containing core layer of the multilayer film of the present invention must provide sufficient operability so that the film after biaxial orientation exhibits crystallinity which is low enough to permit the secondary orientation of the film, which imparts the uniaxial shrinkability to the film, without tearing. The core layer material can be a single polypropylene homopolymer material which is sufficiently atactic and which has a specific melting point, as determined by the DSC (Differential Scanning Calorimetery) method, e.g., at a heating rate of 2° C./minute. Alternately, the core layer material can comprise a blend of a more isotactic polypropylene with modifiers which are polyolefin materials which are less crystallizable due to a higher degree of chain imperfections or lower isotacticity. Suitable DSC. melting points for the core layer, blended or not, can be less than 160° C., e.g., less than 150° C., or even less than 140° C.

Modifiers suited to use in the present invention include polyolefins other than isotactic polypropylene. The modifier can be selected from the group consisting of atactic polypropylene, syndiotactic polypropylene, ethylene-propylene copolymer, propylene-butene-1 copolymer, ethylene-propylene-butene-1 terpolymer, polybutene-1, and linear low density polyethylene.

Several ways have been found to provide a polypropylene core having a higher degree of chain imperfections and the desired post primary orientation crystallinity. The desired crystallinity avoids tearing of the biaxially oriented film during secondary orientation at stretch levels of greater than 30% or greater than 35%, e.g., up to 40% or even up to 45%. Isotactic polypropylene, i.e., polypropylene having less than 5% atacticity, say less than about 3% atacticity, can be combined with a modifier, e.g., atactic polypropylene, to provide a suitable core layer. Atactic content can be measured by a polymer's insolubility in boiling n-hexane with chain imperfections being observed via NMR tests.

In one aspect of the present invention, atactic polypropylene can be used alone or added to isotactic polypropylene in amounts such that the resulting mixture has atacticity greater than about 2%, preferably greater than about 6%, e.g. 6 to 15%. A blend of 15% atactic polypropylene (about 15% atacticity) and 85% isotactic polypropylene (about 4.5% atacticity) is especially preferred. This blend has an overall atacticity of about 6.75%.

Commercially available isotactic propylene suited to use in the present invention includes Fina 3371 from Fina Oil and chemical Co., Chemical Div., Dallas, Tex. Atactic polypropylenes which are commercially available include L1300 from Novolen of BASF Corp., Parsippany, N.J.

In another embodiment, the present invention employs a core layer which comprises polypropylene as described above, preferably isotactic polypropylene, mixed with polybutene-1 modifier to provide a core layer containing 2 to 15 wt. % polybutene-1, preferably 5 to 10 wt. % polybutene-1. Suitable polypropylene/polybutene-1 homogeneous blends are described in U.S. Pat. No. 3,808,304, the disclosure of which is incorporated herein by reference. This disclosure teaches blends containing from 30 to 90 weight parts of polypropylene, and correspondingly, from 70 to 10 weight parts of polybutene-1. Suitable polybutylenes include PB 8430, available from Shell Chemical Co. of Houston, Tex.

In yet another aspect of the invention, the core layer comprises polypropylene as described above, preferably isotactic polypropylene, mixed with ethylene-propylene copolymer modifier, e.g., 2 to 10 wt. % ethylene-propylene copolymer, preferably 3 to 10 wt. % E-P copolymer. Suitable E-P copolymer can contain from 2 to 7 wt. % ethylene, the balance being propylene. The copolymers can have a melt flow rate (MFR) at 230° C. generally ranging from 2 to 15, preferably from 3 to 8. The crystalline melting point is usually from about 125° to about 150° C., and the number average molecular weight is about 25,000–100,000. The density is preferably from 0.89 to 0.92 g/cm$^3$. Suitable E-P copolymers include EP 8573, available from Fina Oil and Chemical Co., Chemical Div., Dallas, Tex.

In still another aspect of the invention, the core layer is a blend of polypropylene as described above, preferably isotactic polypropylene, mixed with 0 to 10 wt. % ethylene-propylene copolymer, said copolymer preferably being 50 to 100 wt. % E-P copolymer which contains from 0.5 to 1 wt. % ethylene, the balance being propylene. These fractional copolymers are commercially available as ready-mix resin containing 0.6 wt. % ethylene (4173 from Fina).

In another aspect of the invention, the core layer is a blend of polypropylene as described above, preferably isotactic polypropylene, mixed with propylene-butene-1 copolymer. The core layer can comprise 5 to 20 wt. % propylene-butene-1 copolymer, preferably 10 to 20 wt. %. Suitable propylene-butene-1 copolymers include Cefor SRD4-105, and Cefor SRD4-104 available from Shell Chemical Co. The core layer can comprise 5 to 20 wt. % of said propylene-butene-1 copolymer as modifier.

In yet another aspect of the invention, the core layer is a blend of polypropylene as described above, preferably isotactic polypropylene, mixed with linear low density polyethylene (LLDPE). These polymers typically have a melt index of 1 to 10. The linear low density polyethylenes should have a density in the range 0.88–0.94 g/cc, preferably, 0.89–0.92 g/cc. The linear low density polyethylenes may be derived from ethylene together with other higher comonomers such as butene-1, hexene-1 or octene-1. The core layer can comprise 2 to 15 wt. % LLDPE, preferably 5 to 10 wt. % LLDPE. Commercially available LLDPEs include Exact 2009, Exact 2010, and Exact 3016 available from Exxon Chemical Co.

In a particularly preferred embodiment, the core layer is a blend of polypropylene as described above, preferably isotactic polypropylene, mixed with syndiotactic polypropylene and, optionally, ethylene-propylene copolymer. Syndiotactic polypropylene can be present in the core layer in amounts ranging from 2 to 60 wt. %, preferably 4 to 30 wt. %, with 0 to 40 wt. % ethylene-propylene copolymer, preferably 0 to 20 wt. % E-P copolymer. Suitable E-P copolymers are described above. The presence of E-P copolymer improves MD tensile strength in the secondary orientation step. However, E-P copolymer content must be carefully determined inasmuch as the presence of E-P copolymer can cause undesirable film elongation even at lower temperatures, e.g., 60° C. (140° F.) drying temperatures, which elongation can cause registration problems during converting processes such as printing.

The syndiotactic polypropylene used as a modifier in the present invention can possess an isotacticity of less than 15%, in particular less than 6%. The mean length of sequence $\bar{n}_r$ of the syndiotactic sequences is preferably greater than about 20, more preferably greater than about 25. The molar mass distribution corresponds to the relation $$M_w = k \times M_n,$$

where $M_w$ stands for the weight average of the molar mass distribution, $M_n$ stands for the number average of the molar mass distribution, and k is a factor which is between about 1 and about 5, preferably between about 2 and about 3.

The weight average is preferably between about 60,000 and about 250,000, in particular between about 90,000 and about 160,000. The mean molar masses can be determined according to customary methods; of these, the method of gel permeation chromatography has proven to be particularly suitable.

Commercially available syndiotactic polypropylene resins suited to use in the present invention include EOD 9502 and EOD 9630 available from Fina.

In yet another aspect of the invention, the core layer is a blend of polypropylene as described above, preferably isotactic polypropylene, mixed with ethylene-propylene-butene-1 terpolymer as modifier. The core layer can comprise 5 to 20 wt. % of the terpolymer. Suitable terpolymers include those containing 3 to 5 wt. % ethylene and 3 to 6 wt. % butene-1. Such terpolymers are available from Chisso, under the trade name Chisso 7700 Series. Other suitable ethylene-propylene-butene-1 terpolymers include those containing 0.5 to 3 wt. % ethylene, and 13 to 20 wt. % butene-1. Such terpolymers are available from Chisso, under the trade name Chisso 7800 Series.

Suitable core layers of the present invention can comprise recycled polypropylene (RPP), e.g., up to 25 wt. % RPP, preferably up to 15 wt. % RPP.

The core layer of the present invention may also comprise a nucleating agent in the range of from about 0.05 to about 0.5 wt. % and preferably in the range of from about 0.1 to about 0.2 wt. %.

The addition of a nucleating agent to the core layer improves long term dimensional stability. The nucleating agent is believed to cause the polypropylene crystallization to occur sooner. The use of a nucleating agent provides a wound film that is more fully crystallized than a film with no nucleating agent. A syndiotactic polypropylene modifier in the range of from about 2% to about 60% in combination with a nucleating agent is particularity preferred.

The nucleating agent may be inorganic or organic. Suitable inorganic nucleating agents include sodium benzoate, calcium stearate, aluminum dibenzoate, aluminum adipate, sodium succinate, and sodium glutarate. Suitable organic nucleating agents include 3,4-dimethyl benzylidine sorbitol.

The core layer of the present invention may also comprise a plurality of voids formed by cavitation about a solid cavitation agent. Polybutene-1 terephthalate (PBT),e.g., in amounts comprising 4 to 10 wt. % of the core layer, well-dispersed as fine spherical particles, e.g., 0.2 to 2 microns in diameter, as described in U.S. Pat. Nos. 5,288, 548, 5,264,277 and 4,632,869, the contents of which are incorporated herein by reference, is a suitable cavitation agent. The spherical particles form microvoids on orientation, resulting in a white opaque product.

The opacity and low light transmission of the film may be enhanced by the addition to the core layer itself of from about 1% by weight and up to about 10% by weight of opacifying compounds, which are added to the melt mixture of the core layer before extrusion. Opacifying compounds which may be used include iron oxides, carbon black, graphite, aluminum, $TiO_2$, and talc.

A 30 micron polygauge, clear film equivalent, white opaque film described above will have a density of 0.6 to 0.75 g/cc, an optical-cavitated thickness gauge of 36 to 45 microns and light transmission of 15 to 25% depending on percentage of PBT dispersed and the orientation conditions, including the extent of stretching as well as MD and TD orientation temperatures.

Such a core layer can further comprise a supporting layer of polypropylene, preferably isotactic polypropylene, on one or both sides of the core. One of said supporting layers may contain 2 to 18 wt. % $TiO_2$. Further description of such use of $TiO_2$-containing layers is found in U.S. Pat. No. 5,091, 236, the contents of which are incorporated herein by reference. The supporting layer may also contain 2 to 60 wt. %, preferably 4 to 30 wt. %, syndiotactic polypropylene. Incorporation of skin layers over the supporting layers serves to encapsulate the abrasive $TiO_2$ and provides a highly opaque, five layer structure. The multilayer film has improved functionality for printing, metallizing, adhesives, coatings, and heat sealability.

Alternatively, clear five layer structures can be prepared by substituting a supporting layer of polypropylene on both sides of the core, which layer does not contain opacifying materials such as $TiO_2$ or PBT.

The aforementioned blends of propylene and other constituents noted above may be admixed by any suitable means to form a homogeneous blend, such as dry mixing, solution mixing, or mixing the two polymers together while in a molten state or combinations thereof.

Skin Layer

The optional skin layer of the present invention may be any of the coextrudable, biaxially orientable heat shrinkable film-forming resins known in the prior art. Such materials include those discussed above which are suited to use in the core layer, including isotactic polypropylene, atactic polypropylene, polypropylene blended with polybutene-1, propylene-butene-1 copolymer, and ethylene-propylene copolymer, including fractional E-P copolymer. In addition, polyethylene or ethylene-propylene-butene-1 terpolymer may be employed as the skin layer.

Ethylene-propylene-butene-1 random terpolymers suited to use in the skin layers of the present invention include those containing 1 to 5 wt. % random ethylene, 10 to 25 wt. % random butene-1. The amounts of the random ethylene and butene-1 components in these copolymers are typically in the range of 10 to 25% total (ethylene plus butene-1). Typical terpolymers of this type include those with about 1 to 5% ethylene and 10 to 25% butene-1.

These copolymers typically have a melt flow rate in the range of about 5 to 10 with a density of about 0.9 and a melting point in the range of about 115° to about 1300° C.

In one aspect of the invention the skin layer is derived from a linear low density polyethylene (LLDPE). These polymers typically have a melt index of 1 to 10. The linear low density polyethylenes may have a density as high as 0.94, usually in the range 0.90–0.91, e.g., 0.92 or 0.91, with a melt index from about 1 to 10. The linear low density polyethylenes may be derived from ethylene together with other higher comonomers such as butene-1, hexene-1 or octene-1.

In another aspect of the invention skin layers of substantially high density polyethylene (HDPE) having a density of 0.94 or greater, with no other olefinic polymeric materials, may be employed. Alternatively, a skin of substantially HDPE with no other olefinic polymeric materials may be employed as the skin layer on one side of the core layer and a skin containing a major proportion of propylene homopolymer, preferably isotactic polypropylene, may be employed as the skin layer on the other side of the core layer.

Using HDPE on both sides or HDPE on one side and isotactic polypropylene on the other side results in improved machinability over the use of terpolymers in the skin layer. When laminated to a second film of similar structure in such a way that the HDPE skins are both on the outside of the structure, heat sealability is maintained. The net result of the lamination could be carried to a single web by using HDPE as the skins on both sides with at least one of the HDPE skins containing some anti-block. HDPE on both outside surfaces produce acceptable heat seals on the side seams as well.

Labels using terpolymer skins on both sides of the web suffer from knife stick and squealing on some labeling machines when used without mobility overlaquers. Knife stick leads to machine jamming while squealing is perceived by the machine suppliers as a condition with a high probability of having label length problems.

The use of HDPE on both sides or HDPE on one side and isotactic polypropylene on the other side eliminates knife stick and squealing in non overlaquer applications. The use of HDPE as skins on both sides of the core results in adequate heat seals. Alternatively, multilayer films with HDPE on one side of the core and propylene homopolymer on the other side of the core may be laminated together in such a manner that the HDPE is the outside layer for both sides of the lamination, resulting in adequate heat sealability.

Each skin layer adjacent to the core layer can range in thickness from 0.5 to 3 microns (0.02 to 0.12 mil), preferably 0.5 to 1.0 micron (0.02 to 0.04 mil), e.g., 0.5 to 0.75 micron (0.02 to 0.03 mil).

Prior to incorporation in the film, e.g., before extrusion, at least one of the skin layers can be compounded with an effective amount of anti-blocking agent, e.g., silica, clays, talc, glass and the like which are preferably provided in the form of approximately spheroidal particles. The major proportion of these particles, for example, anywhere from more than half to as high as 90 wt. % or more, will be of such a size that significant portion of their surface area, for example, from about 10 to 70% thereof, will extend beyond the exposed surface of the skin layer. In a preferred embodiment, the anti-blocking agent comprises non-meltable silicone resin, e.g., particulate cross-linked hydrocarbyl-substituted polysiloxanes. Particularly preferred particulate cross-linked hydrocarbyl-substituted polysiloxanes include the polymonoalkylsiloxanes. Most particularly preferred are non-meltable polymonoalkylsiloxanes characterized as having a mean particle size of 0.5 to 20.0 microns and a three dimensional structure of siloxane linkages. Such materials are available from Toshiba Silicone Co., Ltd., worldwide, and in the United States from General Electric Co., and are marketed under the tradename Tospearl. Other commercial sources of similar suitable materials are also known to exist. Such materials are further described as non-meltable crosslinked organosiloxane resin powders in U.S. Pat. No. 4,769,418, incorporated herein by reference. Effective amounts of the particulate cross-linked hydrocarbyl-substituted polysiloxane anti-blocking agent can range from 100 to 5000 ppm, preferably 1000 to 3000 ppm, say, from 1500 to 2500 ppm, based on loading of the resin from which the upper layer is prepared.

The amount of anti-blocking agent in the skin layer is in the range of from about 0.25 to about 0.75 wt. % anti-block. More than one anti-blocking agent may be used. For example, 0.24 wt. % Sipernat 44, commercially available from 5 Degussa Corporation of Akron, Ohio, and 0.3 wt. % Kaopolite 1152, produced by Kaopolite, Inc. of Union, N.J., may be used. When using HDPE as the skin layer on both sides of the core, it is preferred to use anti-block in at least one side. Likewise, when using HDPE as one skin layer and a propylene homopolymer as the other skin layer, it is preferred to use anti-block only in the propylene homopolymer side.

Reduced coefficient of friction and reduced antistatic characteristics at the surface of the skin layer or layers can be achieved in accordance with the disclosure set out in U.S. Pat. No. 5,264,277, incorporated herein by reference, which discloses the use of migratory slip agents and antistatic agents in multilayer films. Reduced COF may also be obtained by treating one or both skins with 2000 to 15000 ppm silicone oil.

If desired, the exposed surface of the skin layer or skin layers can be treated in a known and conventional manner, e.g., by corona discharge to improve its receptivity to printing inks, coatings, adhesive anchorage, and/or its suitability for such subsequent manufacturing operations as lamination.

It is preferred that all layers of the multilayer film structures of the present invention be coextruded, after which the film can be biaxially oriented (primary orientation) and thereafter secondarily oriented in the direction in which shrinkability is desired. Coextrusion can be carried out in a multilayer melt form through a flat die.

A metallized coating may be applied to the corona treated or flame treated outer layer by any of known methods, for example electroplating, sputtering and vacuum metallizing. A preferred method of metallizing the corona treated outer layer is by vacuum deposition. However, when using the vacuum metallizing process, the use of chemical primers is not necessary to obtain enhanced adhesion of the metallized coating to the substrate.

The metal coating may be any of typical metals such as aluminum, copper, silver and chromium. for example, a layer of aluminum can be deposited on the multilayer film structure of the present invention. The coated film is then wrapped around the container and shrunk to fit the contours of the container. Surprisingly, it has been found that the film of the present invention appears to shrink without the development of any noticeable crazing of the metal.

Primary Orientation

The multilayer coextrudate film is primarily oriented biaxially. Biaxially oriented film can be stretched 3 to 6 times, preferably 4 to 5 times in a first direction, preferably the machine direction (MD), and 5 to 10 times, preferably 7 to 8 times in a second direction which is substantially normal to the first direction, preferably the transverse direction (TD). Biaxial orienting can be carried out using a conventional tenter or stenter machine at a drawing temperature of 100° to 140° C., e.g., 130° C. Generally, biaxial orientation temperatures differ for MD orientation (115° to 130° C., e.g., 120° C.) and TD orientation (130° to 160° C., e.g., 150° C.). Film thickness at this stage can range from 25 to 75 microns (1.0 to 3.0 mils), preferably 25 to 66 microns (1.0 to 2.6 mils). Cooling of the film to temperatures below 100° C. occurs prior to secondary orientation.

Secondary Orientation

The primarily oriented film is then reheated to 100° to 125° C., say 100° to 115° C., preferably by use of heated cylinders and stretched an additional 10 to 40%, preferably 25 to 30%, in the first direction of orientation, e.g., machine direction (MD). In order to minimize TD contraction which can adversely affect TD heat stability, it is desirable to maintain a minimal distance between the reheating roll(s) and the cooling/stretching roll(s) used in secondary orientation. Such distances can be less than 30 cm, e.g., 5 to 10 cm.

The resulting uniaxially shrinkable film after secondary orientation can range in thickness from 10 to 60 microns (0.4 to 2.4 mils), preferably 20 to 50 microns (0.8 to 2.0 mils).

Simultaneous Orientation

The films of the present invention can also be prepared by orienting on a line which utilizes linear motors to directly propel opposed pairs of tenter clips synchronously. The film can be primarily oriented by synchronously accelerating along a diverging path, directly opposed pairs of tenter clips holding the film, thus achieving simultaneous biaxial orientation. Secondary machine direction orientation on the same tenter can be effected along a parallel path subsequent to the diverging path by simultaneously accelerating the directly opposed pairs of tenter clips along some portion of the parallel path.

The use of linear motors to directly propel tenter clips to effect simultaneous biaxial stretching is further disclosed in U.S. Pat. No. 4,853,602 to Hommes et al., the contents of which are incorporated herein by reference in their entirety.

Dimensional Stability

The resulting uniaxially shrinkable film exhibits greater than 15% shrinkage, preferably greater than 18% shrinkage or even 25% shrinkage in the direction of secondary orientation, e.g. machine direction, after 7 minutes of exposure to a temperature above 130° C. However, at temperatures below about 50° C., a shrinkage in the same direction of less than 3%, preferably less than 2%, after seven days is obtained. The present invention's films can exhibit ±5% stability, preferably −2% to +1% stability in the direction normal to that of secondary orientation. Stability of −2% to +1% means that the dimension of the film normal to the direction of secondary orientation, after heating to a temperature above 130° C. shrinks no more than 2% or expands no greater than 1% of the original dimension of the film at room temperature.

The higher temperature range given in the preceding paragraph is typical for the application of labels to containers. The lower temperature range is typical for the storage of film rolls prior to label application. Hence, the shrinkage behavior described ensures good conformance of labels to containers but minimizes defects due to excessive shrinkage in roll form.

Elongation at Lower Temperatures

Another parameter of interest is the resistance to stretching or dimensional stability of the film after secondary orientation in the MD direction (% elongation) under common processing conditions, e.g., print drying temperatures of 54° to 66° C. (130° to 150° F.), preferably 60° C. (140° F.). It is desirable to provide a uniaxially shrinkable film which is resistant to elongation under the tensions 17.8 to 178 g per cm (0.10 to 1.0 pli [pounds per linear inch]), preferably 134 g per linear cm (0.75 pli), and temperatures normally encountered by the film during processes prior to thermoshrinking, e.g., drying after printing. To avoid registration problems during printing, MD elongation at 134 g per linear cm (0.75 pli) should be less than about 0.6% at 60° C. (140° F.), preferably less than 0.4%. MD elongation is generally reduced and is thus less of a problem as secondary stretching (MD orientation) is increased.

Especially preferred films of the present invention show minimal MD elongation and TD shrinkage at processing temperatures of 60° C. and 134 g/cm (0.75 pli), and maximum MD shrinkage at temperatures used to effect shrinkage, e.g., heat tunnel temperatures of 127° to 141° C. (260° to 285° F.), preferably 135° C. (275° F.) or higher, depending on residence time.

The invention is illustrated by the following non-limiting example.

EXAMPLE

In this example 3, 4 dimethylbenzylidine sorbitol, an organic nucleating agent, and 4 wt. % syndiotactic polypropylene are added to the isotactic polypropylene containing core layer to measure the effect on long term stability versus 10 wt. %, 20 wt. % and 30 wt. % syndiotactic polypropylene. The core layer compositions for each run are shown below in Table 1.

Runs 1–6 are produced on a TM Long Film Stretcher/Orienter under the following reaction parameters:

| Temperature | | | | Stretch Setpoint | | |
|---|---|---|---|---|---|---|
| Upper Air | Lower Air | Upper Platen | Lower Platen | MD1 | TD | MD2 |
| 347° F. (161° C.) | 346° F. (160° C.) | 265° F. (115° C.) | 265° F. (115° C.) | 2.0 | 0.3 | 1.0 |

A 4"×2"×40 mil thick sample is placed in the TM Long and the unit is closed. The film sample is thermally equilibrated under hot air for approximately 2 minutes then the MD stretch (MD1) is applied followed by TD stretch. The air is then shut off and the TM Long unit opened and closed quickly to allow the heat to escape. The stretched sheet is then thermally equilibrated for approximately four minutes and 30 seconds under the heat of the platens after which the sample is stretched a second time in the MD(MD2). The film sample is removed and placed in a freezer at 20° F. to 45° F (−7° C. to 7° C.) until the shrinkage behavior testing.

Runs 7 and 8 are produced on a commercial 3 meter orienter.

TABLE 1

| RUN NUMBER | CORE LAYER |
|---|---|
| 1 | 96 wt.% isotactic polypropylene (Fina 3371) + 4 wt. % syndiotactic polypropylene (EOD9502) |
| 2 | 96 wt. % isotactic polypropylene (Fina 3371) + 10 wt. % syndiotactic polypropylene (EOD9502) |
| 3 | 96 wt. % isotactic polypropylene (Fina 3371) + 20 wt. % syndiotactic polypropylene (EOD9502) |

TABLE 1-continued

| RUN NUMBER | CORE LAYER |
|---|---|
| 4 | 96 wt. % isotactic polypropylene (Fina 3371) + 30 wt. % syndiotactic polypropylene (EOD9502) |
| 5 | 95.9 wt. % isotactic polypropylene (Fina 3371) + 4 wt. % syndiotactic polypropylene (EOD9502) + 0.1 wt. % nucleating agent (Millad 3988) |
| 6 | 95.8 wt. % isotactic polypropylene (Fina 3371) + 4 wt. % syndiotactic polypropylene (EOD9502) + 0.2 wt. % nucleating agent (Millad 3988) |
| 7 | 96 wt. % isotactic polypropylene (Fina 3371) + 4 wt. % syndiotactic polypropylene (EOD9502) |
| 8 | 95.9 wt. % isotactic polypropylene (Fina 3371) + 4 wt. % syndiotactic polypropylene (EOD9502) + 0.1 wt. % nucleating agent (Millad 3988) |

The shrinkage behavior of each sample was tested in a hermomechanical analyzer (TMA-SS model SSC/5200 manufactured by SEIKO Instruments) This instrument grasps a 4 mm wide×1 cm long sample by its two ends and applies a constant tension to it. A minimal tension of 1 gm is used to keep the sample taut but prevent undue stretching. The sample chamber is maintained at a constant temperature of 60° C. The instrument measures and records the change in length of the sample to a precision of +/−0.001 μm over a period of 60 min. It is found that a plot of % shrinkage versus the base 10 log logarithm of time in minutes is a substantially straight line after an induction time of less than 10–15 min. The slope of this straight line, in units of %/log (min) is tabulated in Table 2 below. A sample with a slope of zero is ideal since it does not shrink over time in storage. Slopes from 2 to 4 replicate samples are averaged in Table 2 for each run. The table also lists the standard deviation of the replicates for each run.

TABLE 2

| RUN NUMBER | NUMBER OF REPLICATE SAMPLES | MEAN SLOPE | STANDARD DEVIATION |
|---|---|---|---|
| 1 | 2 | 0.28500 | 0.06364 |
| 2 | 3 | 0.24667 | 0.02517 |
| 3 | 4 | 0.13500 | 0.02380 |
| 4 | 2 | 0.07500 | 0.00707 |
| 5 | 4 | 0.16250 | 0.02630 |
| 6 | 4 | 0.15750 | 0.04031 |

Pooled Standard Deviation = 0.03284

Statistical analysis shows in Table 2 that the differences between run means are significant in relation to the within-run, random error. The addition of sPP significantly reduces the slope. A 0.1% loading of the nucleating agent provides the same improvement as 20% sPP.

In addition, high temperature shrinkage remains the same or may be improved when the nucleating agent is added as shown in Table 3 below. Samples are measured and placed in an oven at 275° F. (135° C.) for 7 minutes. The samples are remeasured and the % shrink determined from the change.

TABLE 3

| | % Shrinkage | | | |
|---|---|---|---|---|
| Run Number | 7 | 8 | 1 | 5 |
| % Nucleating Agent | 0 | 0.1 | 0 | 0.1 |
| Original Shrink | 20.2 | 21.1 | 15.5 | 16 |

TABLE 3-continued

| | % Shrinkage | | | |
|---|---|---|---|---|
| Run Number | 7 | 8 | 1 | 5 |
| 14 month aged retest | 14.1 | 15.8 | N/A | N/A |
| 9 month aged retest | N/A | N/A | 14.3 | 15.3 |
| % shrink loss | 30.1 | 25.1 | 7.8 | 4.4 |

N/A = Data Not Available

It will be apparent to those skilled in the art that the specific embodiments discussed above can be successfully repeated with ingredients equivalent to those generically or specifically set forth above and under variable process conditions. From the foregoing specification, one skilled in the art can readily ascertain the essential features of this invention and without departing from the spirit and scope thereof can adapt it to various diverse applications.

It is claimed:

1. A uniaxially heat-shrinkable, biaxially oriented, multi-layer film having a polypropylene-containing core layer and at least one polyolefin-containing skin layer adjacent said core layer,
   said core layer comprising isotactic polypropylene, a modifier which reduces the crystallinity of the polypropylene-containing core layer and a nucleating agent,
   wherein said modifier is selected from the group consisting of atactic polypropylene, syndiotactic polypropylene, ethylene-propylene copolymer, propylene-butene-1 copolymer, ethylene-propylene-butene-1 terpolymer, polybutene-1, and linear low density polyethylene,
   further wherein said film is capable of greater than 15% shrinkage at 100° C. to 145° C. in a first direction with +/−5% stability in a second direction substantially perpendicular to said first direction and said nucleating agent is present in said core layer in an amount, based upon the entire weight of said core layer, sufficient to improve the long-term dimensional stability of said multilayer film,
   and still further wherein said film exhibits improved long-term dimensional stability by having a reduced rate of shrinkage, said rate of shrinkage being determined by measuring the shrinkage at a temperature of 60° C. and expressing the rate of shrinkage as a slope of a line plotting percentage shrinkage versus logarithinic time, wherein the rate of shrinkage of said film is less than the rate of shrinkage of an identical film without said nucleating agent.

2. The multilayer film of claim 1 wherein said modifier is syndiotactic polypropylene.

3. The multilayer film of claim 1, wherein said nucleating agent is inorganic.

4. The multilayer film of claim 1 wherein said nucleating is organic.

5. The multilayer film of claim 3, wherein said nucleating agent is 3,4-dimethyl benzylidine sorbitol.

6. The multilayer film of claim 4, wherein said nucleating agent is selected from the group consisting of sodium benzoate, calcium stearate, aluminum dibenzoate, aluminum adipate, sodium succinate and sodium glutarate.

7. The multilayer film of claim 1, wherein said modifier is syndiotactic polypropylene and said nucleating agent is 3,4-dimethyl benzylidine sorbitol.

8. The multilayer film of claim 1, wherein said skin layer comprises high density polyethylene.

9. The multilayer film of claim 1, wherein said nucleating agent is in an amount in the range of from about 0.05 wt. % to about 0.2 wt. % of the core layer.

10. The multilayer film of claim 1, said film exhibiting improved long-term dimensional stability by having a reduced rate of shrinkage, said rate of shrinkage being determined by measuring the shrinkage at a temperature of 60° C. and expressing the rate of shrinkage as a slope of a line plotting percentage shrinkage versus logarithmic time, wherein the rate of shrinkage of said film is reduced by from around 43% to around 45% in comparison to the rate of shrinkage of an identical film without said nucleating agent.

* * * * *